(12) United States Patent
Koga

(10) Patent No.: US 6,512,534 B2
(45) Date of Patent: Jan. 28, 2003

(54) CLOCK CONTROL APPARATUS AND METHOD AND IMAGE FORMING APPARATUS USING CLOCK CONTROL APPARATUS

(75) Inventor: Katsuhide Koga, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/777,659

(22) Filed: Feb. 7, 2001

(65) Prior Publication Data

US 2002/0003568 A1 Jan. 10, 2002

(30) Foreign Application Priority Data

Feb. 8, 2000 (JP) ........................................ 2000-030512

(51) Int. Cl.$^7$ ................................................ B41J 2/435
(52) U.S. Cl. .................................................... 347/249
(58) Field of Search ................................. 347/232, 234, 347/235, 239, 248, 249, 250, 116; 358/296

(56) References Cited

U.S. PATENT DOCUMENTS 4,962,431 A * 10/1990 Imakawa et al. ........... 358/296
5,365,258 A * 11/1994 Murata et al. .............. 347/232

* cited by examiner

Primary Examiner—Hai Pham
(74) Attorney, Agent, or Firm—Fitzpatrick, Cella, Harper & Scinto

(57) ABSTRACT

A clock control apparatus generates a clock for laser drive in latent image formation in an image forming apparatus. A main-scanning synchronizing clock generation unit generates a synchronizing clock synchronized with a main-scanning synchronizing signal based on the main-scanning synchronizing signal and an original clock. A delay unit delays the synchronizing clock so as to correct for a mechanical shift upon latent image drawing by a laser drive. A pseudo-main-scanning synchronizing signal generation unit generates a pseudo-main-scanning synchronizing signal based on the synchronizing clock delayed by the delay unit, and supplies the pseudo-main-scanning synchronizing signal to the main-scanning synchronizing clock generation unit. The main-scanning synchronizing clock generation unit, which generates a clock synchronized with the pseudo-main-scanning synchronizing signal. The clock is supplied via a clock selection unit to a PWM generation unit, and is used for the laser drive.

19 Claims, 13 Drawing Sheets

CLOCK CONTROL APPARATUS AND METHOD AND IMAGE FORMING APPARATUS USING CLOCK CONTROL APPARATUS

BACKGROUND OF THE INVENTION

Field of the Invention

The present invention relates to an image forming apparatus which generates image information of, e.g., an electrostatic latent image on an image holding surface of a photosensitive body, electrostatic transfer medium or the like, by introducing optically-modulated laser light from a laser light source, and more particularly, to a clock control apparatus and method and an image forming apparatus using the apparatus preferably applicable to a color image forming apparatus having plural drums for outputting overlapped plural color images.

BACKGROUND OF THE INVENTION

Conventionally, in color image forming apparatuses having plural drums, as a print sheet is conveyed from one of the drums to the next, a positional shift for each color occurs in a main-scanning direction, perpendicular to a paper conveyance direction, which causes color unevenness. To correct such positional shift in the main-scanning direction (hereinafter, simply referred to as "positional correction"), a construction to perform positional correction by 1/n pixel (n is an integer) in the main-scanning direction for each color is used.

Hereinafter, a main-scanning direction synchronization control technique related to general positional correction will be described with reference to FIGS. 7 to 12.

In FIG. 7, reference numeral 601 denotes a main-scanning synchronization detection circuit; 602, an original clock generation circuit; 603, a main-scanning synchronizing clock generation unit which inputs a main-scanning synchronizing signal S601 outputted from the main-scanning synchronization detection circuit 601 and an original clock S602 outputted from the original clock generation circuit 602 and outputs a pixel clock S603 synchronized with the main-scanning synchronizing signal S601; 604, a delay unit which delays the pixel clock S603 outputted from the main-scanning synchronizing clock generation unit 603 by a delay amount (delay by 1/n pixel) in accordance with a positional correction amount designation signal S606 designated from a CPU (not shown); 605, a PWM generation unit which generates a PWM signal corresponding to a pixel density from a delayed pixel clock S604 outputted from the delay unit 604, image data S607 and a pixel density designation signal S608 inputted from an image processor (not shown); and 606, a laser driving unit which drives a laser 607 in accordance with the PWM signal S605 outputted from the PWM generation unit 605.

The delay unit 604 has a circuit construction as shown in FIG. 8. In this example, the pixel delay amount is ¼ pixel. In this figure, numerals 610 to 612 denote delay devices each having a delay amount equal to ¼ of the duration of the pixel clock 5503. Numeral 613 denotes a selector which inputs four clocks respectively shifted by ¼ clock, i.e., the pixel clock S603, a clock S610 obtained by the delay device 610 by delaying the pixel clock S603 by ¼, a clock S511 obtained by the delay device 611 by delaying the clock S510 by ¼, and a clock S512 obtained by the delay device 612 by delaying the clock S611 by ¼, and selects one of the input clocks in accordance with the positional correction amount designation signal S606 from the CPU (not shown) and outputs the selected clock as the delayed pixel clock S604.

In the timing chart of FIG. 9A, the clocks S603 and S604 have the signal waveforms shown, in a case where the delay devices 610 to 612 are ideal delay devices. Further, the delayed pixel clock S604 in FIG. 9A has the signal waveform shown in a case where a C input of the selector is selected in accordance with the positional correction amount designation signal S606 from the CPU.

FIG. 10 shows an example of circuit construction of the PWM generation unit 605 which inputs the delayed pixel clock S604 outputted from the delay unit 604.

In FIG. 10, numeral 620 denotes a D/A converter which D/A-converts the image data S607 inputted from the image processor (not shown); 621, a triangular wave generator comprising an integrator and the like, which is driven by the delayed pixel clock S604, and which generates a triangular wave in synchronization with the delayed pixel clock S604; and 624, a comparator which compares an analog signal S620 corresponding to the image data outputted from the D/A converter 620 with a triangular wave S621 outputted from the triangular wave generator 621. The triangular wave generator 621 and the comparator 624 together constitute a high-density PWM generator P1.

Further, in FIG. 10, numeral 622 denotes a divider which ³⁄₂-divides the pixel clock S604 (i.e., divides the clock by 3⁄2). The divider 622 has a circuit construction as shown in FIG. 11. FIG. 12A is a timing chart of respective signals in FIG. 11. The construction and operation of the divider 622 will be described with reference to FIGS. 11 and 12A. A double clock S631, which is double of the pixel clock S604, is generated by exclusive OR logic operation by a logic element 630 between the input delayed pixel clock S604 and a clock S630 obtained by the delay device 610 by delaying the pixel clock S604 by ¼. Then, the double clock S631 is ⅓ divided by the ⅓-divider 631, into a 3⁄2 clock S622.

Returning to FIG. 10, numeral 623 denotes a triangular wave generator comprising an integrator or the like, which is driven by the 3⁄2 clock S622 outputted from the 3⁄2-divider 622, and which generates a triangular wave in synchronization with the 3⁄2 clock S622. Numeral 625 denotes a comparator which compares the analog signal S620 corresponding to the image data outputted from the D/A converter 620 with the triangular wave S623 outputted from the triangular wave generator 623. The divider 622, the triangular wave generator 623 and the comparator 625 together constitute a low-density PWM generator P2.

Numeral 626 denotes a selector which inputs PWM waveforms S624 and S625 of different periods outputted from the comparator 624 in the high-density PWM generator P1 and the comparator 625 in the low-density PWM generator P2, selects one of the waveforms in accordance with the pixel density designation signal S608 from the image processor (not shown), and outputs the selected waveform as the PWM signal S605.

In a color copying machine, the circuit as described above is provided respectively for yellow, magenta, cyan and black colors. A CPU (not shown) calculates a relative shift amount in the main-scanning direction for each color, and inputs a positional correction amount into the delay unit 604 for each color, thereby correcting the shift by 1/n pixel in the main-scanning direction for each color.

However, as the delay devices 610 to 612 used for positional correction are not ideal devices, the actual delay amount at the rising edge and that at the falling edge of pixel clock outputted from the delay device are somewhat different. Consequently, the duty of the clock inputted into the PWM generation unit 605 at the next stage is not 50%. For this reason, in the conventional art, the PWM signal cannot be uniform depending on printing pixel density, and in such case, image quality is seriously degraded. This problem will be described with reference to FIGS. 9B, 12B and 13. Note that in the following description, the PWM signal is non-uniform when the printing pixel density is low (3/2 frequency division).

As described above, if the delay devices 610 to 612 are ideal devices, delay is effected by an amount of 1/4 pixel at the rising edge and the same at the falling edge, as shown in FIG. 9A. In the figure, the letter T denotes one period of the pixel clock S603; and 1/4T, 1/4 period of one pixel.

However, actually, at the rising edge, delay occurs in an amount α in addition to 1/4 pixel period, and at the falling edge, the delay amount is augmented by an amount β in addition to 1/4 pixel period (generally, the relation α>β holds). Accordingly, the pixel clock S603 is delayed as a clock S610' by the delay device 610. Similarly, it is delayed as clocks S611' and S612' by the delay devices 611 and 612.

Accordingly, if the C input of the selector 613 is selected by the positional correction amount designation signal S606 from the CPU (not shown), a clock S604' where a Hi period is shorter by 2×(α−β), is inputted into the PWM generation unit 605 at the next stage. This means that the pixel clock duty changes in correspondence with the positional correction amount. For example, if an input D of the selector 613 corresponding to a 3/4-pixel delay is selected, the Hi period of the clock is shorter by 3×(α−β).

In a case where the clock S604' where the duty is a little reduced is inputted into the PWM generation unit 605, in the high-density PWM generator P1 in FIG. 10, the PWM signal S605 with approximately uniform width as shown in FIG. 13 can be obtained. However, in the low-density PWM generator P2 in FIG. 10, as the double clock is generated by further delaying the clock S604' with a slightly reduced duty by the delay device 610, an accurate double clock S631 cannot be generated, and instead a clock S631' with different shift positions is obtained. If a 3/2 clock of pixel clock is generated by 1/3-dividing the clock S631' a clock S622' having alternate short and long periods is obtained, and as shown in FIG. 13, the PWM signal S605 has alternate short and long periods. The unevenness of the PWM signal using low-density PWM causes pitch unevenness in reproduction of uniform image data, thus degrading image quality.

SUMMARY OF THE INVENTION

The present invention has been made in consideration of the above conventional problem, and has as its object to enable generation of uniform PWM signal regardless of recording pixel density and to enable high-quality image formation.

According to one aspect of the present invention, the foregoing object is attained by providing a control apparatus for controlling a clock for drawing drive in an image forming apparatus, comprising a first synchronizing clock generation unit that generates a first synchronizing clock synchronized with a main-scanning synchronizing signal based on the main-scanning synchronizing signal and an original clock, a delay unit that generates a delayed clock by delaying the first synchronizing clock in accordance with a designated correction amount, a pseudo-synchronizing signal generation unit that generates a pseudo-synchronizing signal based on the delayed clock and a second synchronizing clock generation unit that generates a second synchronizing clock synchronized with the pseudo-synchronizing signal based on the pseudo-synchronizing signal and the original clock.

In accordance with this aspect of the present invention, as described above, a pseudo-synchronizing signal is generated from the main-scanning synchronizing signal in accordance with the correction amount, and the second synchronizing clock is obtained in synchronization with the pseudo-synchronizing signal. Thus, the duty ratio of the timing-corrected pixel clock (second synchronizing clock) can be maintained the same as that of the original clock.

Further, according to another aspect of the present invention, the foregoing object is attained by providing a control method for controlling a clock for drawing drive in an image forming apparatus, comprising the steps of generating a first synchronizing clock synchronized with a main-scanning synchronizing signal based on the main-scanning synchronizing signal and an original clock, generating a delayed clock by delaying the first synchronizing clock in accordance with a designated correction amount, generating a pseudo-synchronizing signal based on the delayed clock, and generating a second synchronizing clock synchronized with the pseudo-synchronizing signal based on the pseudo-synchronizing signal and the original clock.

Further, according to another aspect of the present invention, an image forming apparatus using the above clock control apparatus can be provided.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

A preferred embodiment of the present invention will now be described in detail in accordance with the accompanying drawings.

Figure 6:
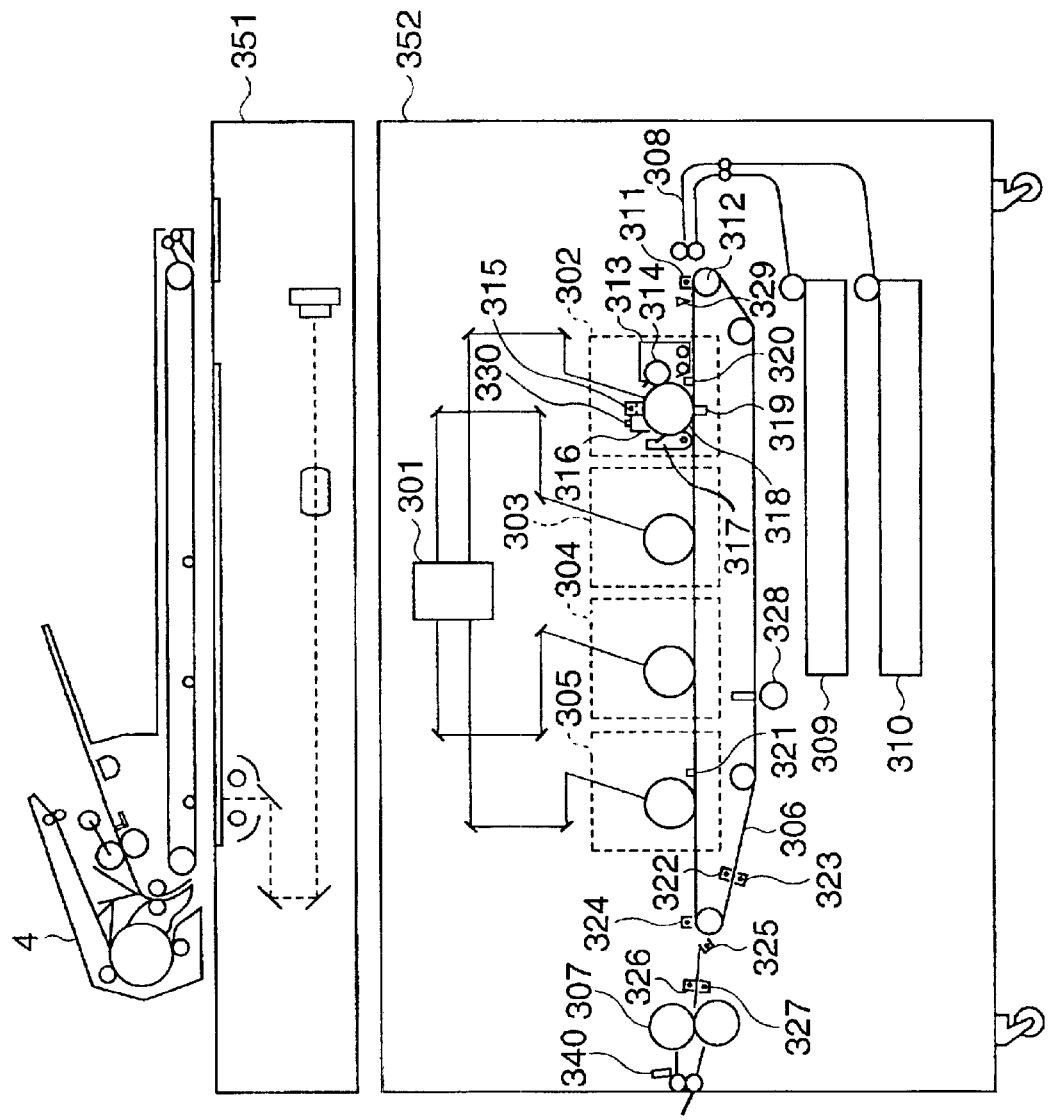
FIG. 6 is a cross-sectional view of a color image forming apparatus according to an embodiment of the invention.

FIG. 6 is a cross-sectional view showing a color image forming apparatus according to an embodiment of the present invention. The apparatus has a color reader 351 which reads a color image original and further performs digital editing processing or the like and a printer 352 having different image holders which reproduces a color image in correspondence with respective color digital image signals sent from the reader.

In FIG. 6, numeral 301 denotes a polygonal scanner which scans laser light on an electrostatic drum; 302, a yellow (Y) image formation unit at an initial stage; and 303, 304 and 305, magenta (M), cyan (C) and black (K) image formation units. The polygonal scanner 301 scans laser beams from four laser devices driven independently for YMCK colors by a laser controller (not shown) on the electrostatic drums for the respective colors. Respective main-scanning synchronizing signals for the respective colors are generated by four main-scanning synchronization detection circuits which detect the scanned laser beams. In a case where two polygonal mirrors are co-axially provided and are driven by one motor, as in the present embodiment, the main-scanning direction for the Y, M laser beams and that for the C, K laser beams, for example, are opposite to each other. In this case, the C and K image data, for example, represent mirror images in the main-scanning direction with respect to the other (Y and M) images.

In the image formation unit 302, numeral 318 denotes an electrostatic drum on which a latent image is formed by exposure to laser light; 313, a developer which performs toner development on the drum 318; 314, a sleeve in the developer 313 for application of developing bias in toner development; 315, a primary charger which charges the electrostatic drum 318 to a desired potential; 317, a cleaner which cleans the surface of the drum 318 after transfer; 316, an auxiliary charger which causes discharge from the surface of the drum 318 cleaned by the cleaner 317, for excellent charge by the primary charger 315; 330, a pre-exposure lamp which eliminates residual charge on the drum 318; and 319, a transfer charger which transfers a toner image on the drum 318 onto a transfer medium by performing discharge from the rear of transfer belt 306.

Numerals 309 and 310 denote cassettes containing transfer media; 308, a supply member which supplies the transfer media from the cassettes 309 and 310; 311, an attraction charger which causes the transfer medium supplied by the supply member 308 to be attracted the transfer belt 306; and 312, a transfer belt roller which is used for rotation of the transfer belt 306 and which causes the transfer medium to be attracted to the transfer belt 306 in cooperation with the attraction charger. In the present embodiment, a print sheet is used as the transfer medium.

Numeral 324 denotes a discharger which assists separation of the transfer medium from the transfer belt 306; 325, a separation charger which prevents disturbance of image due discharge upon separation of the transfer medium from the transfer belt 306; 326 and 327, pre-fixing chargers which complement attraction force on the separated transfer medium for the toner thereby prevent disturbance of image; 322 and 323, transfer-belt dischargers which causes discharge from the transfer belt 306 for electrostatic initialization; and 328, a belt cleaner which removes contamination of the transfer belt 306.

Numeral 307 denotes a fixer which thermal-fixes the toner image to the transfer medium separated from the transfer belt 306 and recharged by the pre-fixing chargers 326 and 327; 340, a paper discharge sensor which detects the transfer medium on a conveyance route passing through the fixer; and 329, a paper end sensor which detect's the end of transfer medium supplied on the transfer belt. A detection signal from the paper end sensor 329 is sent from the printer 325 to the reader 351, and is used for generating a subscanning synchronizing signal for sending a video signal from the reader 351 to the printer 352.

In the present embodiment, a laser main-scanning synchronization control circuit in the color image forming apparatus having the above construction will be described.

Figure 12A:
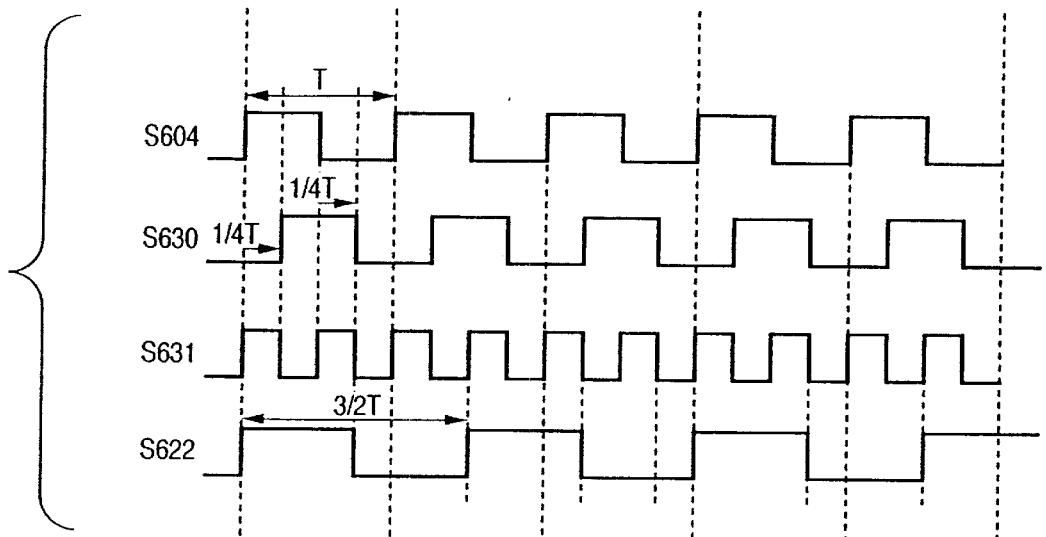
FIGS. 12A and 12B are timing charts explaining the operation of the ½ division unit.
Figure 12B:
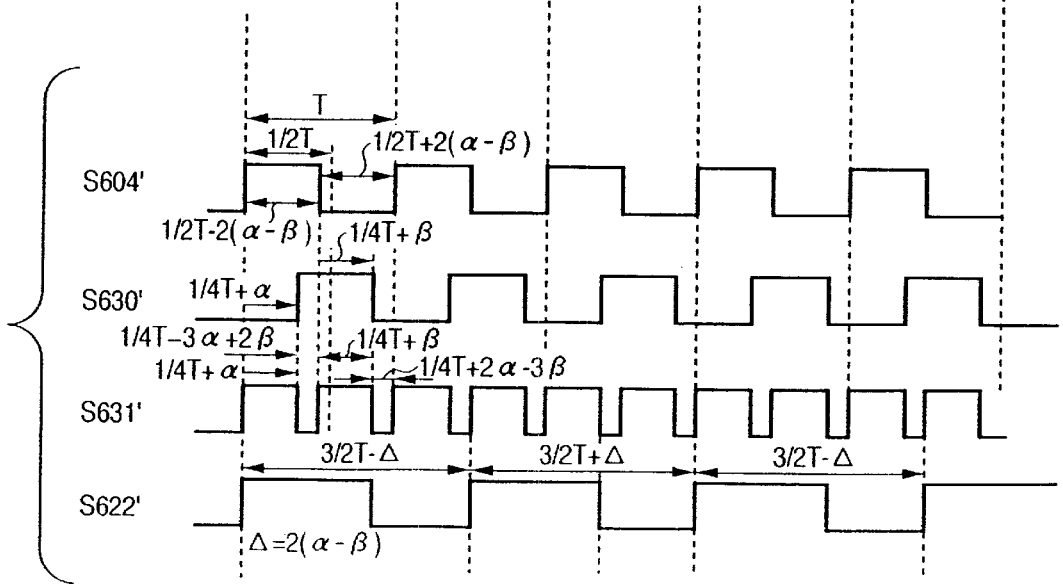
Figure 13:
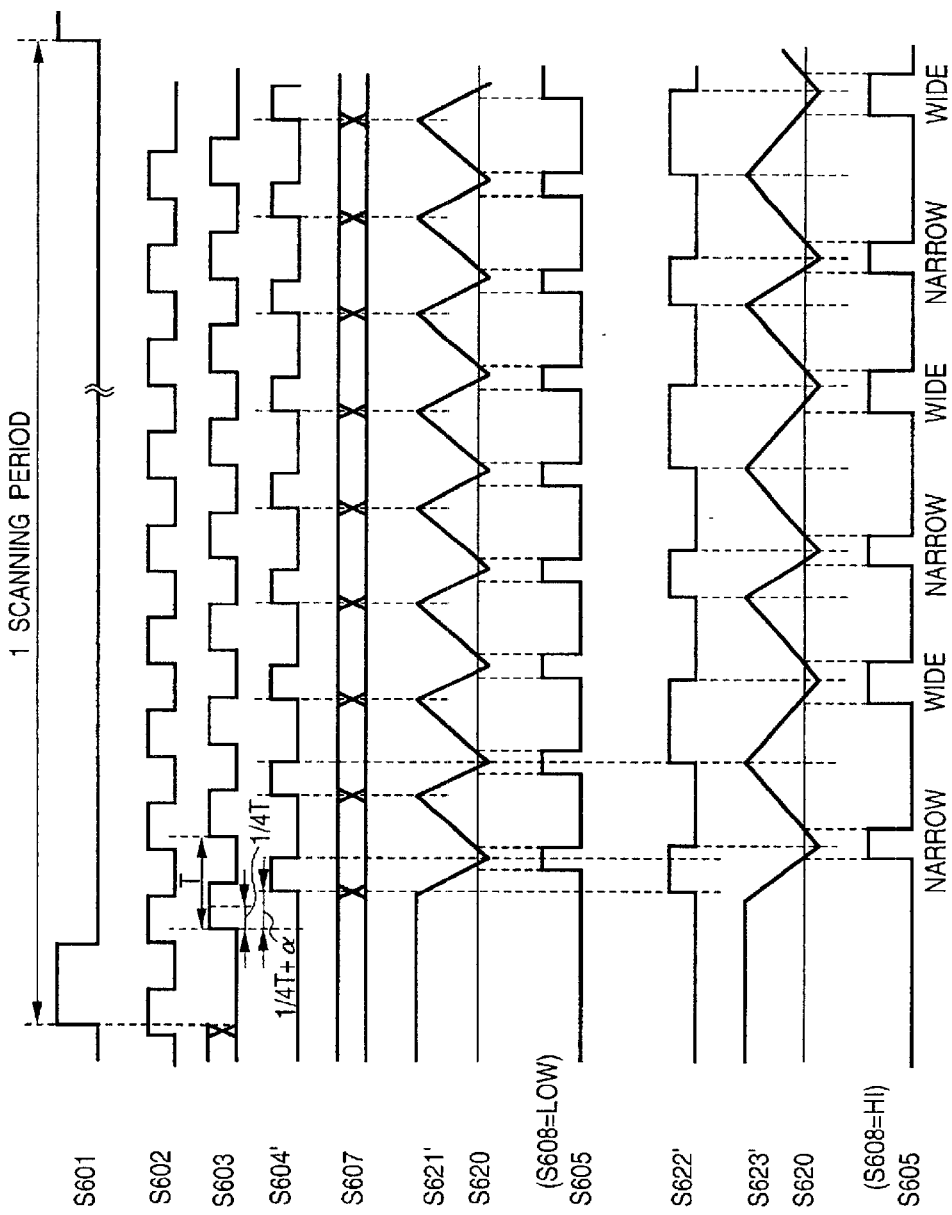
FIG. 13 is a timing chart explaining the problem in the general laser control circuit.

The periodical error of the ⅔ clock in the low printing pixel density as described in "The Background of the Invention" is, in a case where the input C of the selector 613 corresponding to ½-pixel delay is selected, $(\frac{3}{2})T-2(\alpha-\beta)$, $(\frac{3}{2})T+2(\alpha-\beta),(\frac{3}{2})T-2(\alpha-\beta), \ldots$, as shown in FIG. 12B. It is understood from this matter that the pixel clock inputted into the PWM generation unit 605 should be a pure clock which does not pass through the delay unit (i.e., a clock with a duty ratio of 50%).

Figure 1:
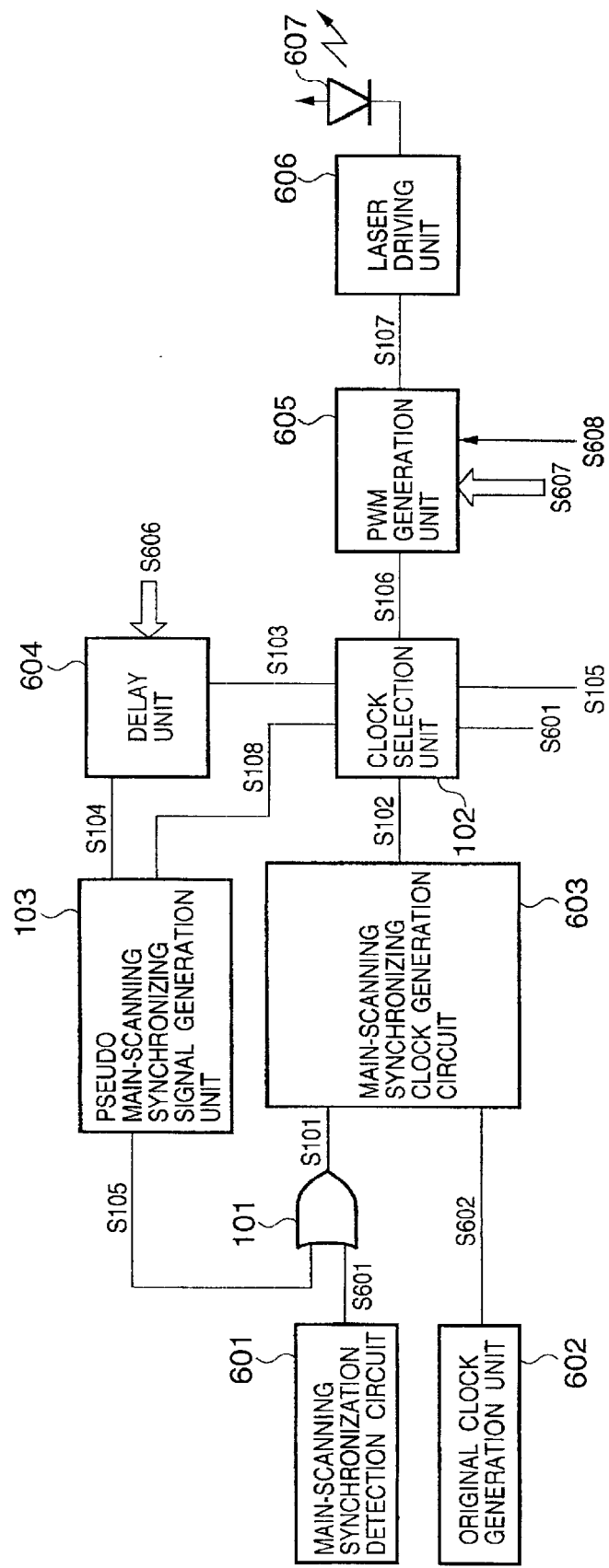
FIG. 1 is a block diagram showing the construction of a laser control circuit of an image forming apparatus according to an embodiment of the present invention.
Figure 7:
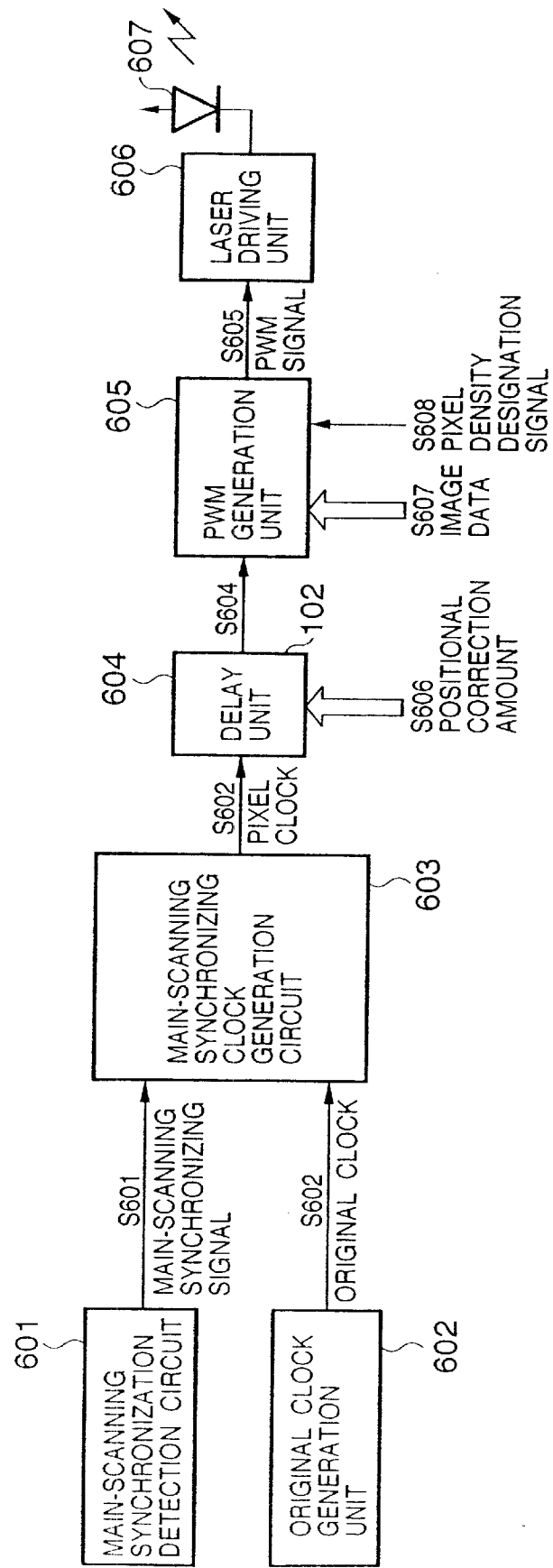
FIG. 7 is a block diagram showing the construction of a general laser control circuit of image forming apparatuses.

FIG. 1 is a block diagram showing the construction of the main-scanning synchronization control circuit according to the present embodiment. Note that in FIG. 1, circuits/units having the same functions as those of the circuits/units in FIG. 7 have the same reference numerals. In FIG. 1, numeral 601 denotes the main-scanning synchronization detection circuit; 602, the original clock generation circuit; and 603, the main-scanning synchronizing clock generation unit which inputs a main-scanning synchronizing signal S101 outputted from a logic device 101 to be described below and the original clock S602 outputted from the original clock generation circuit 602, and outputs a pixel clock S102 synchronized with the main-scanning synchronizing signal S101.

Numeral 102 denotes a clock selection unit which selects one of pixel clocks S103 and S106 to be outputted, as described below with reference to FIGS. 2 and 4A. More specifically, the clock selection unit 102 outputs the pixel clock S103 synchronized with the main-scanning synchronizing signal S101 to the delay unit 604 from a point where the main-scanning synchronization detection circuit 601 outputs the main-scanning synchronizing signal S601 to a point where a pseudo-main-scanning synchronizing signal generation unit 103, to be described below outputs a pseudo-main-scanning synchronizing signal S105, and the clock selection unit 102 outputs the pixel clock S106 synchronized with the pseudo-main-scanning synchronizing signal S105 to the PWM generation unit 605 from the point where the pseudo-main-scanning synchronizing signal generation unit 103 outputs the pseudo-main-scanning synchronizing signal S105 to a point where the main-scanning synchronization detection circuit 601 outputs the main-scanning synchronizing signal S601 for the next scanning line.

Figure 8:
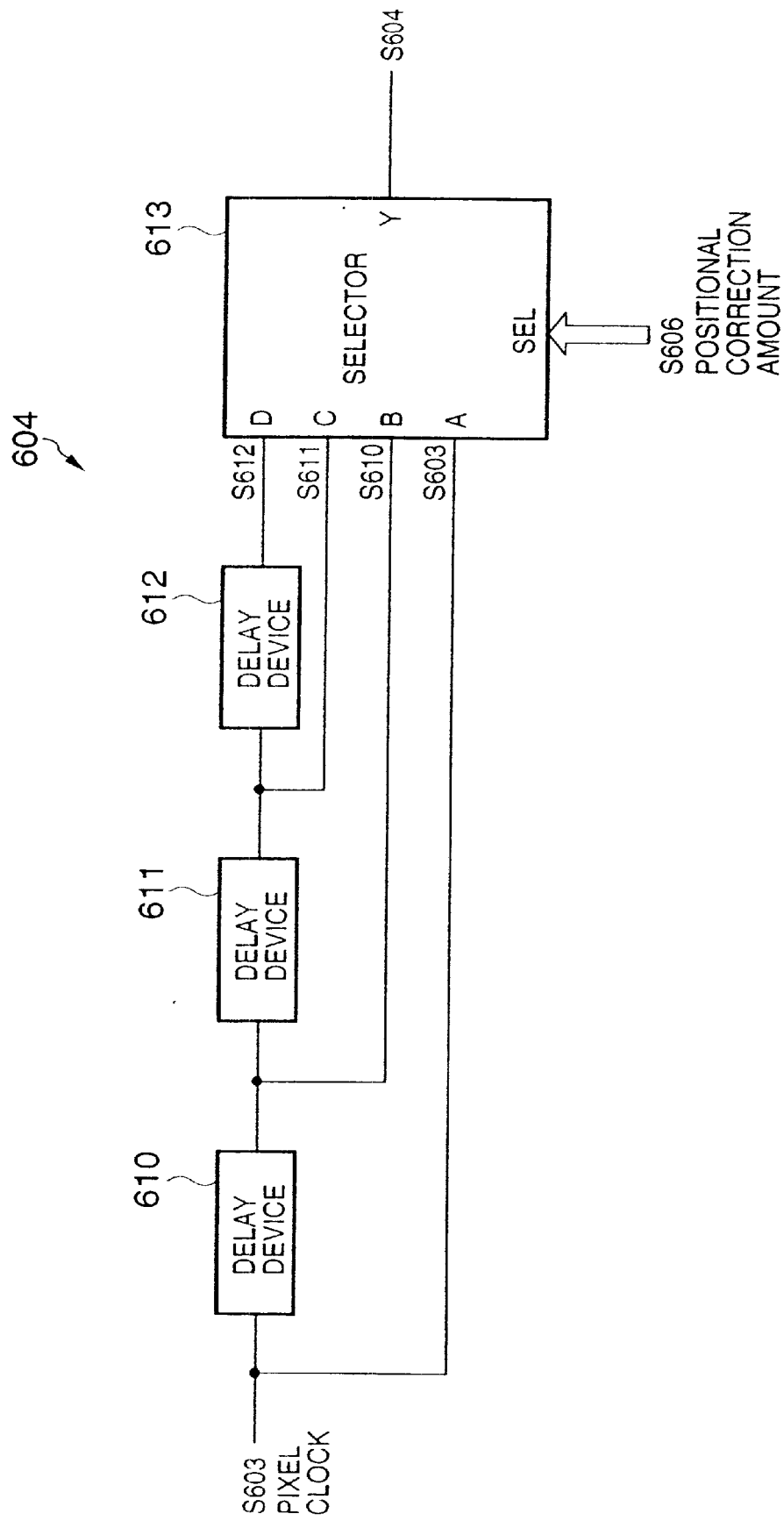
FIG. 8 is a block diagram showing the construction of a delay unit for positional correction for the laser control circuit.
Figures 9A, 9B:
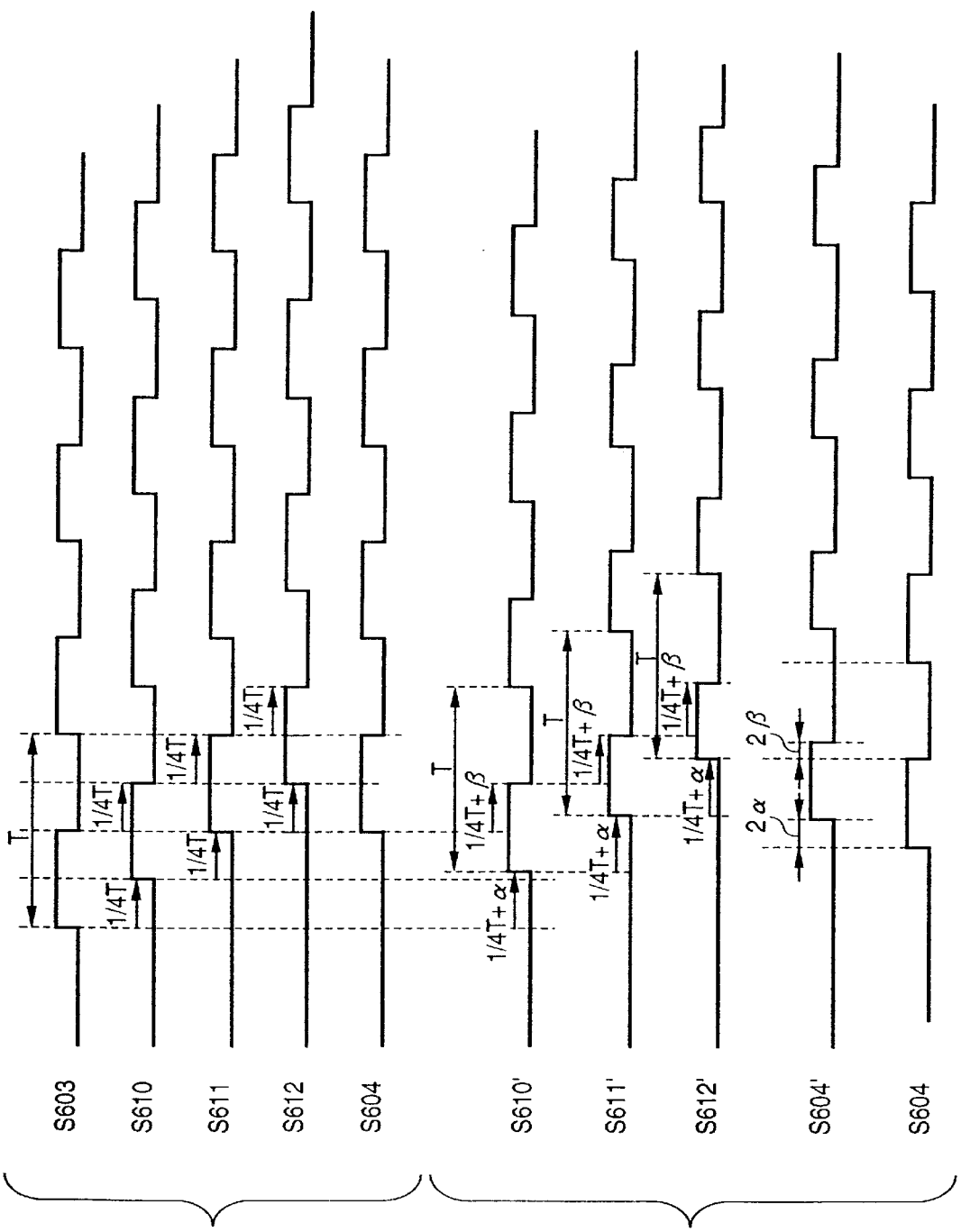
FIGS. 9A and 9B are timing charts showing operation timings of the delay units for positional correction.

Numeral 604 denotes the delay unit which delays the pixel clock S103 outputted from the clock selection unit 102 by a delay amount (delay by 1/n pixel) in accordance with the positional correction amount designation signal S606 designated from the CPU (not shown). Note that the delay unit 604 has the construction shown in FIG. 8. Numeral 103 denotes the pseudo-main-scanning synchronizing signal generation unit which generates the one-shot pseudo-main-scanning synchronizing signal S105 from a delay clock S104 outputted from the delay unit 604 and outputs the signal S105. The operation of the pseudo-main-scanning synchronizing signal generation unit 103 will be described below with reference to FIGS. 3 and 4B.

Numeral 101 denotes the logic device which outputs a logical inclusion between the main-scanning synchronizing signal S601 outputted from the main-scanning synchronization detection circuit 601 and the pseudo-main-scanning synchronizing signal S105 outputted from the pseudo-main-scanning synchronizing signal generation unit 103; 605, the PWM generation unit which inputs the pixel clock S106 synchronized with the pseudo-main-scanning synchronizing signal S105 selected by the clock selection unit 102, and generates the PWM signal corresponding to the pixel density from the image data S607 and the pixel density designation signal S608 inputted from the image processor (not shown); and 606, the laser driving unit which drives the laser 607 in accordance with the PWM signal S605 outputted from the PWM generation unit 605.

Figures 4A, 4B:
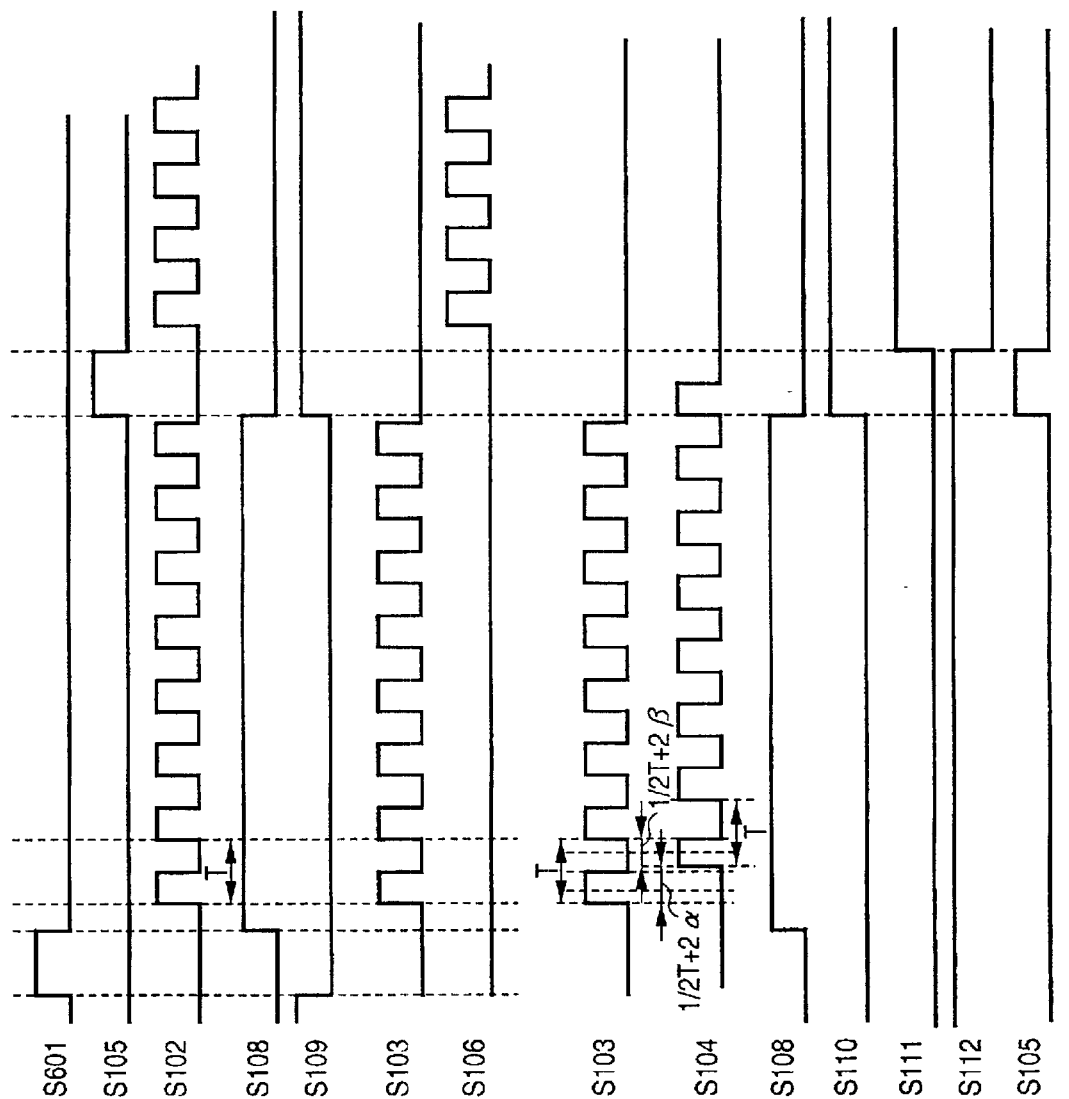
FIGS. 4A and 4B are timing charts explaining the operations of the clock selection unit and the pseudo-main-scanning synchronizing signal generation unit in the laser control circuit according to this embodiment.

Next, the operations of the clock selection unit 102 and the pseudo-main-scanning synchronizing signal generation unit 103 will be described with reference to FIGS. 4A and 4B, showing the respective operation timings.

Figure 2:
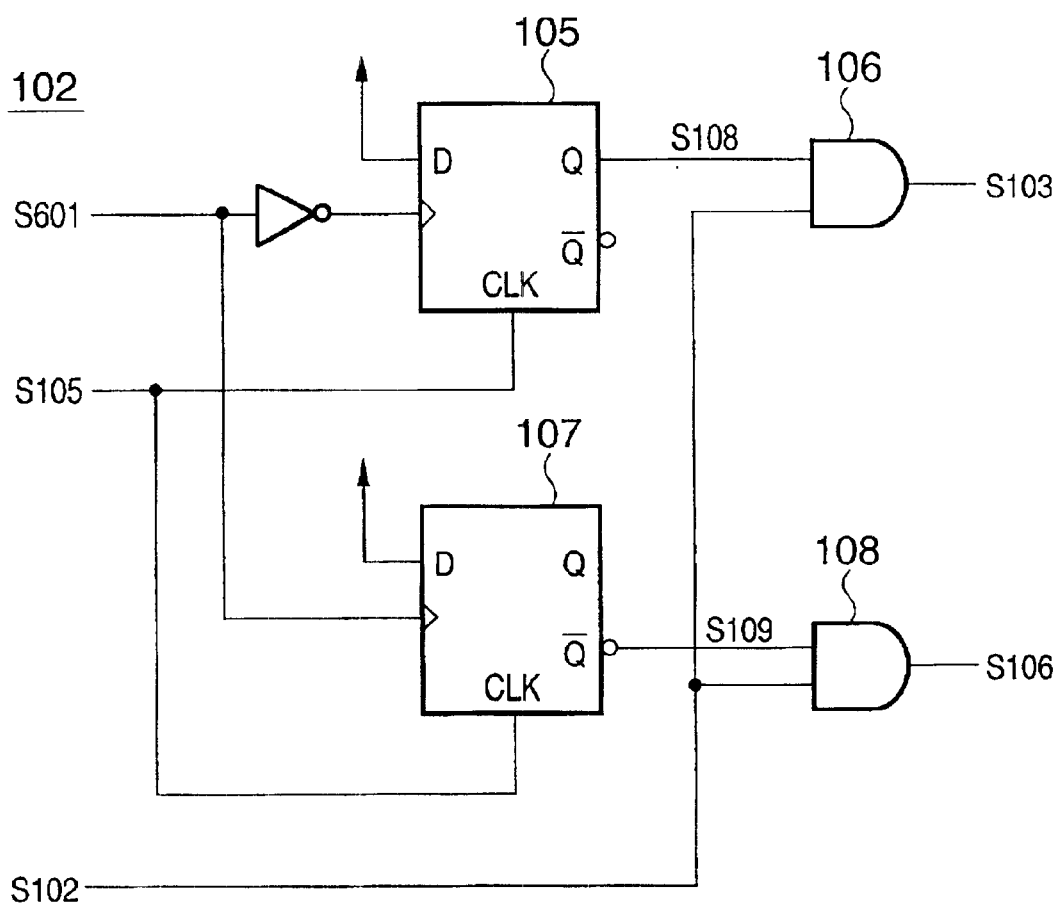
FIG. 2 is a block diagram showing the construction of a clock selection unit in the laser control circuit according to this embodiment.

FIG. 2 is a block diagram showing the construction of the clock selection unit 102. In FIG. 2, numeral 105 denotes a flip-flop which outputs a Hi level signal at the rising edge of the main-scanning synchronizing signal S601 from the main-scanning synchronization detection circuit 601, and outputs a Low level signal at the rising edge of the pseudo-main-scanning synchronizing signal S105, to be described below. Accordingly, an output signal S108 from the flip-flop 105 becomes Hi from the falling edge of the main-scanning synchronizing signal S601 to the rising edge of the pseudo-main-scanning synchronizing signal S105 as shown in FIG. 4A. Numeral 107 denotes a flip-flop which outputs a Low level signal at the rising edge of the main-scanning synchronizing signal S601 from the main-scanning synchronization detection circuit 601, and outputs a Hi level signal at the rising edge of the pseudo-main-scanning synchronizing signal S105. Accordingly, an output signal S109 from the flip-flop 109 becomes Low from the rising edge of the main-scanning synchronizing signal S601 to the rising edge of the pseudo-main-scanning synchronizing signal S105, as shown in FIG. 4A.

Numeral 106 denotes an AND device which outputs the pixel clock S102 outputted from the main-scanning synchronizing clock generation unit 603, as the pixel clock S103, to the delay unit 604 while the output signal S108 from the flip-flop 105 is in the Hi period. Numeral 108 denotes an AND device which outputs the pixel clock S102 outputted from the main-scanning synchronizing clock generation unit 603, as the pixel clock S106, to the PWM generation unit 605, while the output signal S109 from the flip-flop 107 is in the Hi period (at this timing, the pixel clock 102 is synchronized with the pseudo-main-scanning synchronizing signal S105).

Accordingly, while the main-scanning synchronizing signal S601 from the main-scanning synchronization detection circuit 601 is inputted and the pixel clock S102 synchronized with the main-scanning synchronizing signal S601 is inputted into the clock selection unit 102, the pixel clock S103 is outputted to the delay unit 604 in FIG. 1.

The delay unit 604 delays the pixel clock S103 by a delay amount (delay by 1/n pixel) in accordance with the positional correction amount designation signal S606 designated from the CPU (not shown), and outputs the delayed clock as the pixel clock S104 to the pseudo-main-scanning synchronizing signal generation unit 103. In the present embodiment, the delay unit has the construction described in FIG. 8. In this case, as denoted by S103 and S104 in FIG. 4B, the ½-pixel delay, i.e., the C input of the selector 613 (FIG. 8), is selected.

Figure 3:
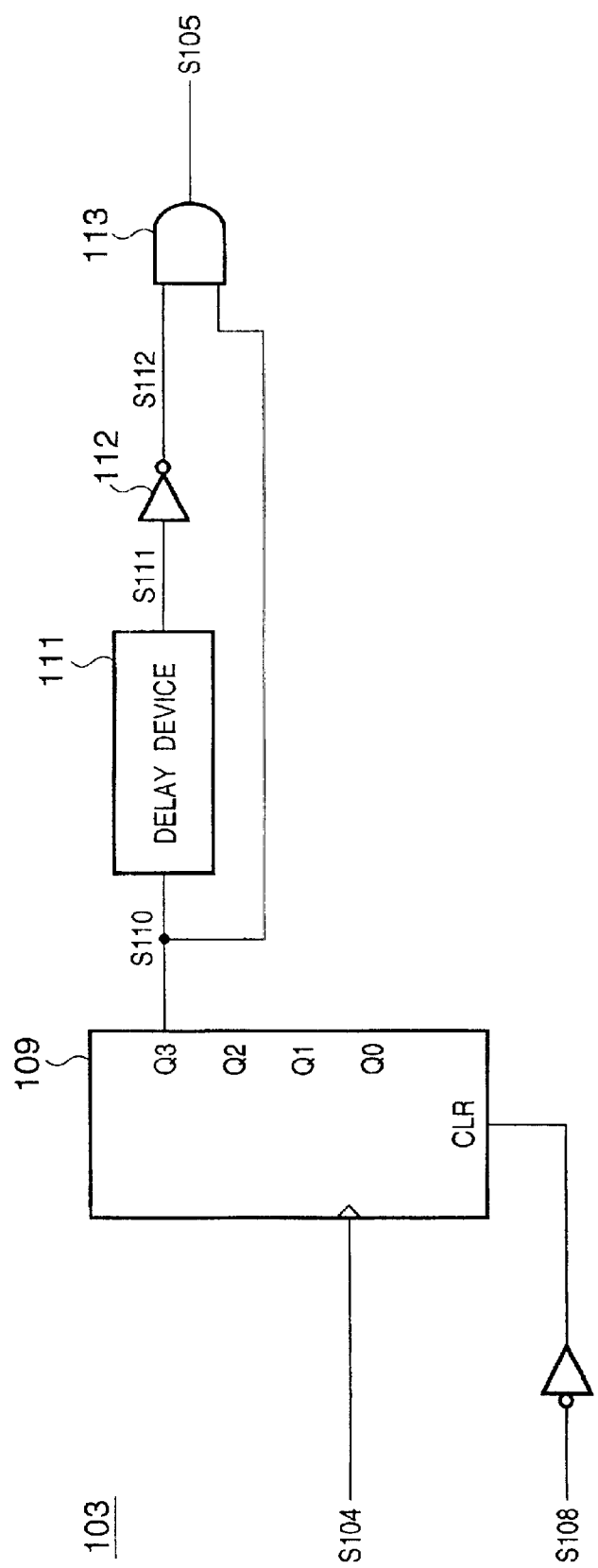
FIG. 3 is a block diagram showing the construction of a pseudo-main-scanning synchronizing signal generation unit in the laser control circuit according to this embodiment.

Next, The construction of the pseudo-main-scanning synchronizing signal generation unit 103 will be described with reference to FIG. 3. In FIG. 3, numeral 109 denotes a 4-bit counter for counting the delayed pixel clock S104, which is cleared in the Low period of the gate signal S108 inputted from the clock selection unit 102; 111, a delay device which delays a Q3 (third-bit) output S110 from the 4-bit counter 109 by a predetermined period; 112, an inverter which inverts a signal S111 delayed and outputted by the delay device 111 and outputs the inverted signal; and 113, an AND device which inputs a signal S112 outputted from the inverter 112 and the signal S110 from the counter 109, and obtains a logical conjunction between the input signals.

In the above construction, the pseudo-main-scanning synchronizing signal generation unit 103 generates the pseudo-main-scanning synchronizing signal S105 as a one-shot pulse having a predetermined time width at a point where the delayed pixel clock S 104 has been counted to a predetermined number (8 clocks in this example, as shown in FIG. 4B).

As the pseudo-main-scanning synchronizing signal S105 generated as above is provided, through the OR device 101 in FIG. 1, to the main-scanning synchronizing clock generation unit 603, the main-scanning synchronizing clock generation unit 603 outputs the pixel clock S102 synchronized with the pseudo-main-scanning synchronizing signal S105.

At this time, since the gate signal S108 is Low and the signal S109 is Hi as shown in FIG. 4A, the clock selection unit 102 outputs the pixel clock S102 synchronized with the pseudo-main-scanning synchronizing signal S105 to the PWM generation unit 605. Accordingly, the PWM generation unit 605 generates a pure clock which does not pass through the delay unit 604, i.e., a PWM wave with a duty ratio of 50%.

Figure 5A:
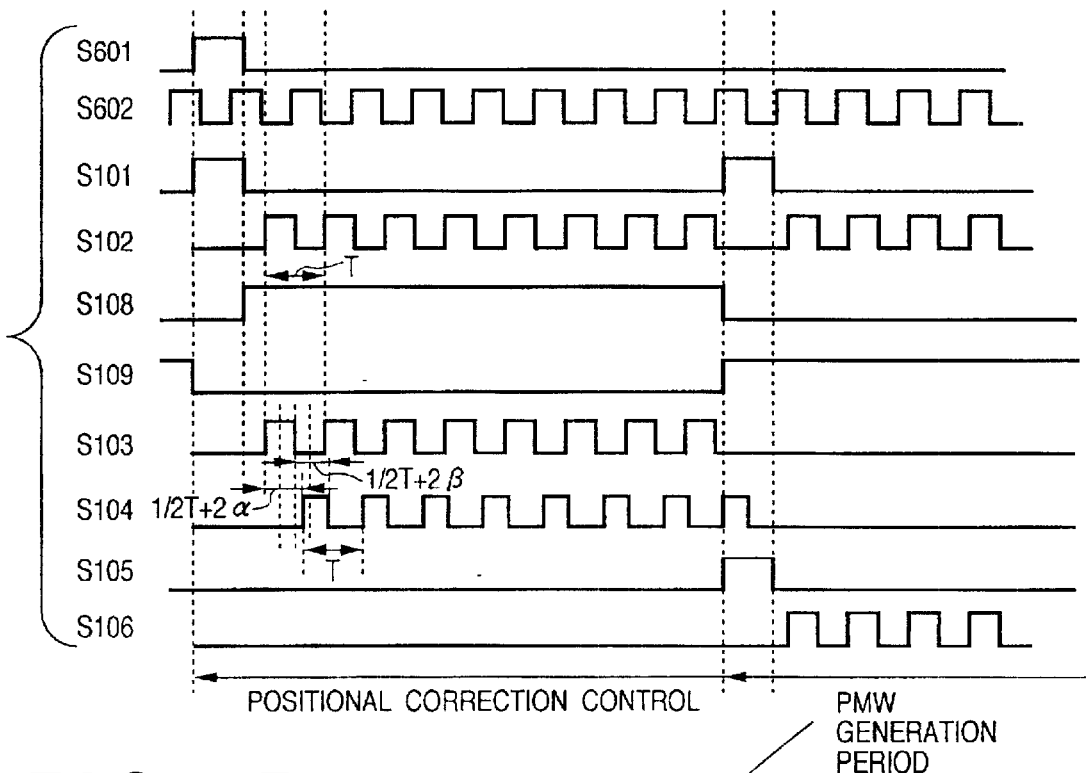
FIGS. 5A and 5B are timing charts explaining the operation of the laser control circuit according to this embodiment.
Figure 5B:
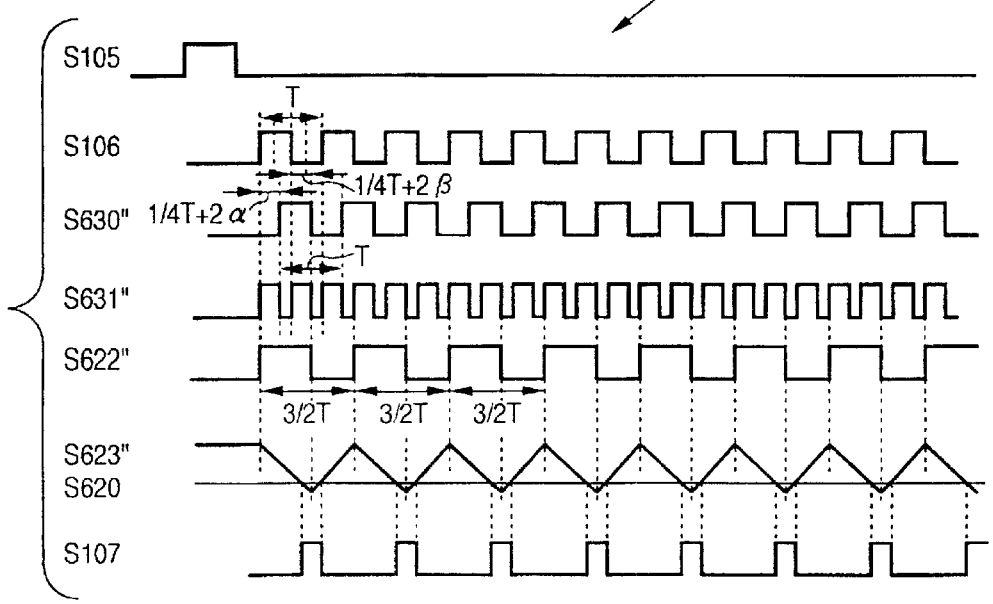

FIGS. 5A and 5B are timing charts explaining the operation described above. As shown in FIG. 5A, the delay unit 604 for positional correction is used for the pseudo-main-scanning synchronizing signal generation unit 103 to output the pseudo-main-scanning synchronizing signal S105, and the pixel clock used for PWM generation after the output of the pseudo-main-scanning synchronizing signal S105 is the clock S106 with a duty ratio of 50% (a pixel clock synchronized with the pseudo-main-scanning synchronizing signal). Accordingly, in the low-density PWM generation, the inconvenience (generation of nonuniform PWM) described in the "Background of the Invention" section does not occur.

Figure 10:
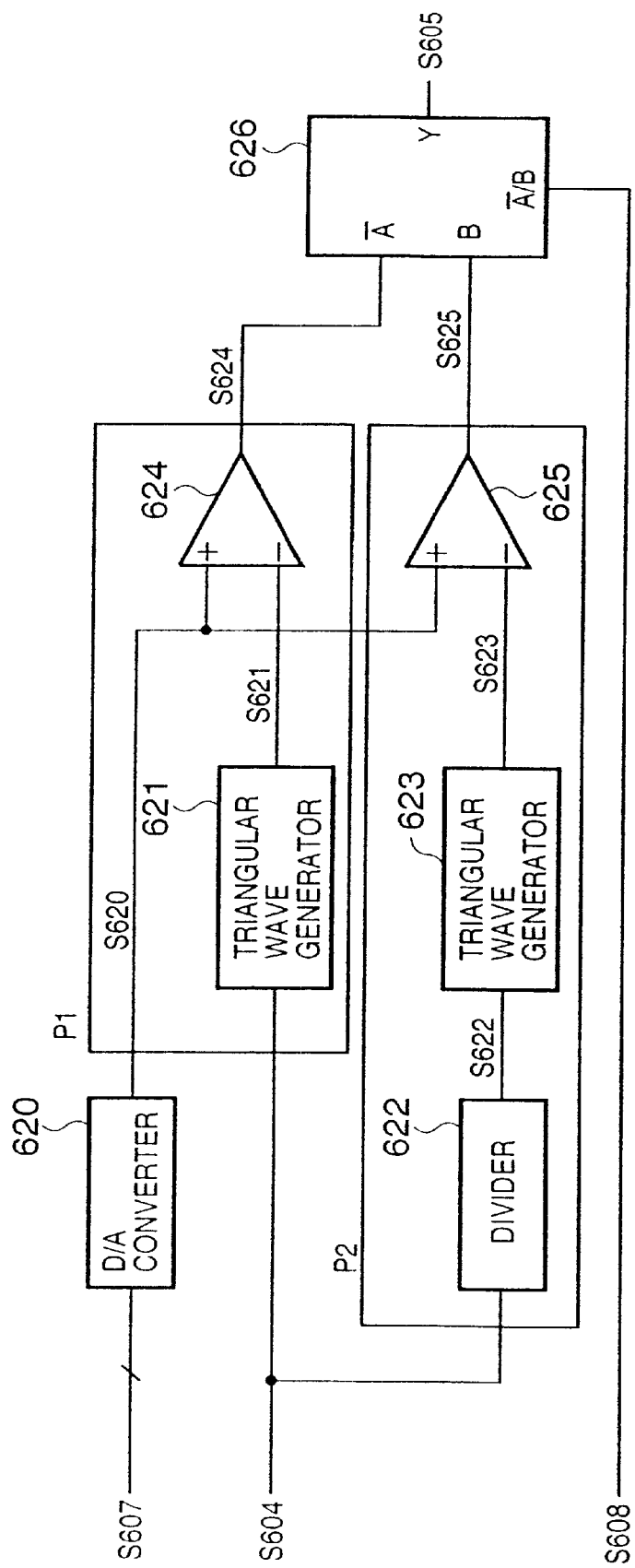
FIG. 10 is a block diagram showing the construction of a PWM generation unit in the laser control circuit.
Figure 11:
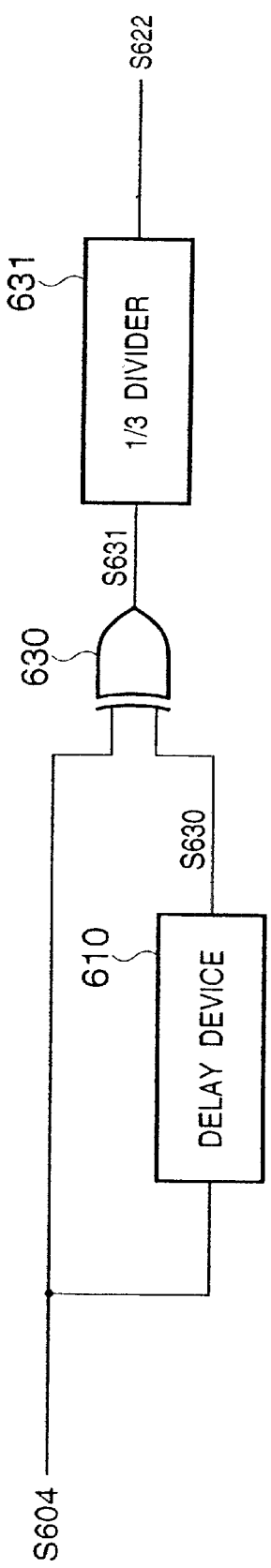
FIG. 11 is a block diagram showing the construction of a ½ division unit in the laser control circuit.

Next, the generation of the low-density PWM will be described with reference to FIG. 5B. The clock S106 is inputted into the ³⁄₂-divider 622 in the PWM generation unit 605 (See FIG. 10). As described in FIG. 11, the ³⁄₂-divider 622 outputs a signal (S630" here) obtained by delaying the clock by ¼ pixel by the delay unit 610.

By the exclusive OR between the signal S630" and the pixel clock S106, a double clock S631" is generated. At this time, even if the duty ratio of the signal S630" is not 50%, one period of the double clock S631" is accurately ½)T because the duty ratio of the pixel clock S106 is 50%. Accordingly, a uniform-period ³⁄₂ clock S622" is generated by ⅓-dividing the double clock S631" by the ⅓-divider 631.

As described above, according to the present embodiment, by generating a pixel clock having a duty ratio of 50% inputted into the PWM generation unit 605, the period of the ³⁄₂-clock S622" is uniform, and thereby the PWM waveform S107 is caused to be uniform. Accordingly, high-quality image formation can be achieved, regardless of printing pixel density. That is, since the pixel clock positionally-corrected by 1/n pixel, inputted into the PWM generation unit, is a pure clock which does not pass through the delay device, a uniform PWM signal can be generated regardless of printing pixel density, and thus high-quality image formation can be obtained.

The present invention can be applied to a system constituted by a plurality of devices (e.g., a host computer, an interface, a reader and a printer) or to an apparatus comprising a single device (e.g., a copy machine or a facsimile apparatus).

As described above, according to the present invention, since a uniform PWM signal can be generated regardless of printing pixel density, high-quality image formation can be effected.

As many apparently widely different embodiments of the present invention can be made without departing from the spirit and scope thereof, it is to be understood that the invention is not limited to the specific embodiments thereof except as defined in the appended claims.

What is claimed is:

1. A control apparatus for controlling a clock for drawing drive in each of plural color image forming units of a color image forming apparatus which forms a color image by overlapping plural color images formed by the color image forming units, said control apparatus comprising:

a first synchronizing clock generation unit that generates a first synchronizing clock synchronized with a main-scanning synchronizing signal based on said main scanning synchronizing signal and an original clock;

a delay unit that generates a delayed clock by delaying said first synchronizing clock in accordance with a designated correction amount, the designated correction amount corresponding to a positional shift in the main-scanning direction of a color image formed by one of the color image forming units;

a pseudo-synchronizing signal generation unit that generates a pseudo-synchronizing signal based on said delayed clock generated by said delay unit; and a second synchronizing clock generation unit that generates a second synchronizing clock synchronized with said pseudo-synchronizing signal based on said pseudo-synchronizing signal and said original clock.

2. The apparatus according to claim 1, wherein said pseudo-synchronizing signal generation unit counts said delayed clock and outputs a one-shot pulse.

3. The apparatus according to claim 1, wherein said first synchronizing clock generation unit and said second synchronizing clock generation unit are realized as one clock generation circuit, and wherein said apparatus further comprises a selection unit that outputs said first synchronizing clock to said delay unit while said clock generation circuit outputs said first synchronizing clock, and outputs said second synchronizing clock for drawing drive while said clock generation circuit outputs said second synchronizing clock.

4. The apparatus according to claim 3, wherein said selection unit provides an output from said clock generation circuit as said first synchronizing clock to said delay unit from a point where said selection unit inputs said main-scanning synchronizing signal to a point where said selection unit inputs said pseudo-synchronizing signal, and provides the output from said clock generation circuit as said second synchronizing clock to the drawing drive from the point where said selection unit inputs said pseudo-synchronizing signal to a point where said selection unit inputs a next main-scanning synchronizing signal.

5. The apparatus according to claim 1, wherein drawing for which said drawing drive is provided includes latent image drawing by laser, and wherein said correction amount is designated so as to correct a mechanical shift upon said latent image drawing.

6. A control method for controlling a clock for drawing drive in each of plural color image forming units of a color image forming apparatus which forms a color image by overlapping plural color images formed lay the color image forming units, said control method comprising the steps of:

generating a first synchronizing clock synchronized with a main-scanning synchronizing signal based on the main-scanning synchronizing signal and an original clock;

generating a delayed clock by delaying the first synchronizing clock in accordance with a designated correction amount, the designated correction amount corresponding to a positional shift in the main-scanning direction of a color image formed by one of the color image forming units;

generating a pseudo-synchronizing signal based on the delayed clock; and generating a second synchronizing clock synchronized with the pseudo-synchronizing signal based on the pseudo-synchronizing signal and the original clock.

7. The method according to claim 6, wherein the pseudo-synchronizing signal is a one-shot pulse outputted by counting the delayed clock.

8. The method according to claim 6, wherein the first synchronizing clock and the second synchronizing clock are generated by one clock generation circuit, and wherein said method further comprises a selection step, of determining an output destination so as to delay the first synchronizing clock to generate the pseudo-synchronizing signal while the clock generation circuit outputs the first synchronizing clock, and changing the output destination so as to use the second synchronizing clock in the drawing drive while the clock generation circuit outputs the second synchronizing clock.

9. The method according to claim 8, wherein, in said selection step, an output from the clock generation circuit is used as the first synchronizing clock from a point where the main-scanning synchronizing signal is inputted to a point where the pseudo-synchronizing signal is inputted, and the output from the clock generation circuit is used in the drawing drive as the second synchronizing clock from the point where the pseudo-synchronizing signal is inputted to a point where a next main-scanning synchronizing signal is inputted.

10. The method according to claim 6, wherein drawing for which the drawing drive is provided includes latent image drawing by laser, and wherein the correction amount is designated so as to correct a mechanical shift upon the latent image drawing.

11. An image forming apparatus having a plurality of color image forming units and forming a color image by overlapping plural color images formed by said plurality of color image forming units, said image forming apparatus comprising:

a first synchronizing clock generation unit that generates a first synchronizing clock synchronized with a main scanning synchronizing signal based on said main scanning synchronizing signal and an original clock;

a delay unit that generates a delayed clock by delaying said first synchronizing clock in accordance with a designated correction amount, the designated correction amount corresponding to a positional shift in the main-scanning direction of a color image formed by one of said color image forming units;

a pseudo-synchronizing signal generation unit that generates a pseudo-synchronizing signal based on said delayed clock generated by said delay unit;

a second synchronizing clock generation unit that generates a second synchronizing clock synchronized with said pseudo-synchronizing signal based on said pseudo-synchronizing signal and said original clock; and drawing means for performing a drawing operation based on said second synchronizing clock and image data to be used in image formation.

12. The apparatus according to claim 11, wherein said pseudo-synchronizing signal generation unit counts said delayed clock and outputs a one-shot pulse.

13. The apparatus according to claim 11, wherein said first synchronizing clock generation unit and said second synchronizing clock generation unit are realized as one clock generation circuit, and wherein said apparatus further comprises a selection unit that outputs said first synchronizing clock to said delay unit while said clock generation circuit outputs said first synchronizing clock, and outputs said second synchronizing clock for drawing drive while said clock generation circuit outputs said second synchronizing clock.

14. The apparatus according to claim 13, wherein said selection unit provides an output from said clock generation circuit as said first synchronizing clock to said delay unit from a point where said unit inputs said main-scanning synchronizing signal to a point where said unit inputs said pseudo-synchronizing signal, and provides the output from said clock generation circuit as said second synchronizing clock to the drawing drive from the point where said unit inputs said pseudo-synchronizing signal to a point where said unit inputs a next main-scanning synchronizing signal.

15. The apparatus according to claim 11, wherein said drawing means performs laser drive for latent image formation, and forms a visible image on a print sheet.

16. The apparatus according to claim 15, wherein drawing for which said drawing drive is provided includes latent image drawing by laser, and wherein said apparatus further comprises designation means for designating said correction,amount so as to correct a mechanical shift upon said latent image drawing.

17. The apparatus according to claim 15, wherein said drawing means includes means for introducing optically-modulated laser light from a laser light source on an image holder, writing image information and forming a visible image, and said drawing means transfers the visible image onto a transfer medium thereby forming an image.

18. The apparatus according to claim 15, wherein said drawing means performs PWM modulation by using said second synchronizing clock.

19. An image forming method for image forming apparatus which comprises a plurality of color image forming units and forms a color image by overlapping plural color images formed by the plurality of color image forming units, said image forming method comprising the steps of:

generating a first synchronizing clock synchronized with a main-scanning synchronizing signal based on the main scanning synchronizing signal and an original clock;

generating a delayed clock by delaying the first synchronizing clock in accordance with a designated correction amount, the designated correction amount corresponding to a positional shift in the main-scanning direction of a color image formed by one of the color image forming units;

generating a pseudo-synchronizing signal based on the delayed clock;

generating a second synchronizing clock synchronized with the pseudo-synchronizing signal based on the pseudo-synchronizing signal and the original clock; and performing a drawing operation based on the second synchronizing clock and image data to be used in image formation.

* * * * *

UNITED STATES PATENT AND TRADEMARK OFFICE
CERTIFICATE OF CORRECTION

PATENT NO.    : 6,512,534 B2
DATED         : January 28, 2003
INVENTOR(S)   : Katsuhide Koga It is certified that error appears in the above-identified patent and that said Letters Patent is hereby corrected as shown below:

Column 5,
Line 60, "attracted" should read -- attracted to --.

Column 6,
Line 5, "toner thereby" should read -- toner, thereby to --; and
Line 14, "detect's" should read -- detects --.

Column 8,
Line 14, "The" should read -- the --; and
Line 31, "S 104" should read -- S104 --.

Column 9,
Line 4, "½)T" should read -- (½)T --.

Column 10,
Line 24, "lay" should read -- by --.

Column 12,
Line 12, "correction,amount" should read -- correction amount --; and
Line 24, "for" should read -- for an --.

Signed and Sealed this

Fourteenth Day of October, 2003

JAMES E. ROGAN
*Director of the United States Patent and Trademark Office*